United States Patent
Park et al.

(10) Patent No.: US 9,380,599 B2
(45) Date of Patent: Jun. 28, 2016

(54) METHOD FOR SCHEDULING CONTROL INFORMATION IN MOBILE COMMUNICATION SYSTEM AND METHOD FOR RECEIVING THE SCHEDULED CONTROL INFORMATION

(71) Applicant: Electronics and Telecommunications Research Institute, Daejeon (KR)

(72) Inventors: Hyun Seo Park, Daejeon (KR); Ae Soon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 54 days.

(21) Appl. No.: 14/322,288

(22) Filed: Jul. 2, 2014

(65) Prior Publication Data
US 2015/0009953 A1    Jan. 8, 2015

(30) Foreign Application Priority Data

Jul. 3, 2013 (KR) .......... 10-2013-0078080
Jul. 2, 2014 (KR) .......... 10-2014-0082155

(51) Int. Cl.
*H04W 72/12* (2009.01)

(52) U.S. Cl.
CPC .......... *H04W 72/1273* (2013.01); *H04W 72/12* (2013.01); *H04W 72/1289* (2013.01)

(58) Field of Classification Search
CPC .............. H04W 72/1273; H04W 72/1289; H04W 72/12
USPC .......... 370/310, 328, 329, 330, 345, 347, 348, 370/351, 389, 395.1, 395.4, 431, 436, 437, 370/464, 478; 455/403, 422.1, 450, 452.1, 455/39, 500, 507, 509
See application file for complete search history.

(56) References Cited

U.S. PATENT DOCUMENTS

| | | | |
|---|---|---|---|
| 2009/0175232 A1* | 7/2009 | Kolding | 370/329 |
| 2009/0268630 A1* | 10/2009 | Yellin et al. | 370/252 |
| 2013/0155974 A1* | 6/2013 | Papasakellariou et al. | 370/329 |
| 2014/0328260 A1* | 11/2014 | Papasakellariou et al. | 370/329 |

OTHER PUBLICATIONS

Samsung, "Control Signaling Enhancements for Small Cells" 3GPP TSG RAN WG1 #73, R1-132639, May 20-24, 2013.

* cited by examiner

*Primary Examiner* — Obaidul Huq
(74) *Attorney, Agent, or Firm* — Rabin & Berdo, P.C.

(57) ABSTRACT

Disclosed are a method for scheduling control information and a method for receiving the scheduled control information in a mobile communication system. The method performed in a base station may comprise performing scheduling on a plurality of transmission time intervals (TTIs) including a first TTI to a Nth TTI which are temporally continuous, wherein N is a natural number larger than 1; and transmitting scheduling information obtained from the scheduling to a first terminal. Thus, power consumption of the terminal can be reduced, and overall system capacity can be increased.

11 Claims, 3 Drawing Sheets

METHOD FOR SCHEDULING CONTROL INFORMATION IN MOBILE COMMUNICATION SYSTEM AND METHOD FOR RECEIVING THE SCHEDULED CONTROL INFORMATION

CLAIM FOR PRIORITY

This application claims priorities to Korean Patent Application No. 10-2013-0078080 filed on Jul. 3, 2013 and No. 10-2014-0082155 file on Jul. 2, 2014 in the Korean Intellectual Property Office (KIPO), the entire contents of which are hereby incorporated by references.

BACKGROUND

1. Technical Field

Example embodiments of the present invention relate to a mobile communication technology, and more specifically to a method for scheduling control information for data transmission in a mobile communication system, and a method for receiving the scheduled control information.

2. Related Art

Standardization on a mobile communication system such as A 3rd Generation Partnership Project (3GPP) Long Term Evolution (LTE) and LTE-Advanced is going on in order to enable transmission of various data such as video, wireless data, etc. with a high data rate equal to that of a wired communication network.

In the LTE or LTE-Advanced system, time-frequency resources may be separated into a control region to which control channels such as Physical Downlink Control Channel (PDCCH) are allocated and a data region to which data channels such as Physical Downlink Shared Channel (PDSCH) are allocated. Downlink data may be transmitted from a base station to a terminal through the data region excluding the control region.

Also, in the LTE or LTE-Advanced system, the terminal identifies whether the base station transmits downlink data for it and whether the base station allocates resources for uplink data transmission to it, by performing blind decoding on the control region (that is, searching for the PDCCH corresponding to it in the control region) for each transmission time interval (TTI). According to the current LTE standard specification, the maximum number of blind PDCCH decoding, which can be performed by a terminal, is defined as 44.

Currently, a base station transmits control information for only a TTI in which the control information is transmitted. For example, control information for a first TTI is transmitted in the first TTI, and control information for a second TTI is transmitted in the second TTI. Therefore, the terminal should perform blind decoding for every TTIs to search for control information corresponding to it even when there is no control information corresponding to it or control information is not changed from the previously received one. This causes more power consumption of a battery-powered terminal.

Also, as described above, since a base station transmit control information for every TTIs, the number of OFDM symbols for PDCCH transmission becomes larger, and then resource regions for data transmission decreases so that overall capacity of a system decreases.

SUMMARY

Accordingly, example embodiments of the present invention are provided to substantially obviate one or more problems due to limitations and disadvantages of the related art.

Example embodiments of the present invention provide a method for scheduling control information, which can reduce the number of blind decoding performed by a terminal and increase system capacity.

Also, example embodiments of the present invention provide a method for a terminal to receive the scheduled control information.

In an example embodiment, a scheduling method performed in a base station may comprise performing scheduling on a plurality of transmission time intervals (TTIs) including a first TTI to a $N^{th}$ TTI which are temporally continuous, wherein N is a natural number larger than 1; and transmitting scheduling information obtained from the scheduling to a first terminal.

Here, in the performing scheduling, downlink data for the first terminal may be scheduled on resource areas having same time-frequency position for the plurality of TTIs.

Here, in the performing scheduling, control information including information related to a number of the plurality of TTIs may be mapped to a specific resource area of the first TTI.

Here, in the performing scheduling, control information including position information of resource areas in a second TTI to the $N^{th}$ TTI to be decoded by the first terminal may be mapped to a specific area of the first TTI.

Also, the resource areas in the second TTI to the $N^{th}$ TTI to be decoded by the first terminal may include information which is changed dynamically from the control information mapped in the first TTI.

Also, the information which is changed dynamically may include an index of a Hybrid Automatic Repeat Request (HARQ) process, a new data indicator (NDI), and redundancy version (RV) information.

Here, when positions of the resource areas in the second TTI to the $N^{th}$ TTI to be decoded by the first terminal are fixed, control information to be decoded by the first terminal may be scheduled on the resource areas as common search spaces.

Here, resources in the second TTI to the $N^{th}$ TTI, which are scheduled for the first terminal by the first TTI, may be scheduled for a second terminal.

In other example embodiment, a method for receiving control information scheduled on a plurality of transmission time intervals (TTIs) including a first TTI to a $N^{th}$ TTI which are temporally continuous, performed in a terminal, wherein N is a natural number larger than 1, the method may comprise identifying first control information by performing blind decoding on a control region in the first TTI; and identifying second control information by performing decoding on resource areas having same time-frequency position in a second TTI to the $N^{th}$ TTI, which are indicated by the first control information.

Here, the first control information may include at least one of information related to a number of the plurality of TTIs and position information of resource areas in a second TTI to the $N^{th}$ TTI to be decoded by the first terminal.

Here, the second control information may include information which is changed dynamically from the first control information.

Here, the method may further comprise, after identifying the second control information, reflecting the information which is changed dynamically from the first control information.

Here, the second control information may include an index of a Hybrid Automatic Repeat Request (HARQ) process, a new data indicator (NDI), and redundancy version (RV) information.

Here, in the identifying second control information, when the second control information is not detected in a specific resource area indicated by the first control information, the terminal may identify that a TTI to which the specific resource area belongs is scheduled to another terminal.

Here, the method may further comprise receiving downlink data in each TTI based on the first control information and the second control information.

According to the above-described methods, a base station may transmit signals to a terminal by performing multi-TTI scheduling which can make data transmission using resource areas having a same time-frequency position during multiple TTIs possible.

The terminal obtains information about the number of scheduled TTIs (or, information on duration of the scheduled TTIs) and position information of CCEs in a second TTI to a last TTI by performing blind PDCCH decoding on a first TTI, and then the terminal can receive data transmitted to it by performing PDCCH decoding (not blind decoding) on the identified positions of the CCEs in the following TTIs.

Accordingly, the number of blind decoding performed by a terminal can be minimized, and thus power consumption of the terminal can be reduced.

Also, amount of control information transmitted for each TTI can be reduced by performing scheduling of multiple TTIs at once, and thus the number of OFDM symbols for PDCCH needed for control information transmission in each TTI can be reduced. Also, decrease of the OFDM symbols used for control information transmission makes more data transmission possible, and so overall system capacity may be increased.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
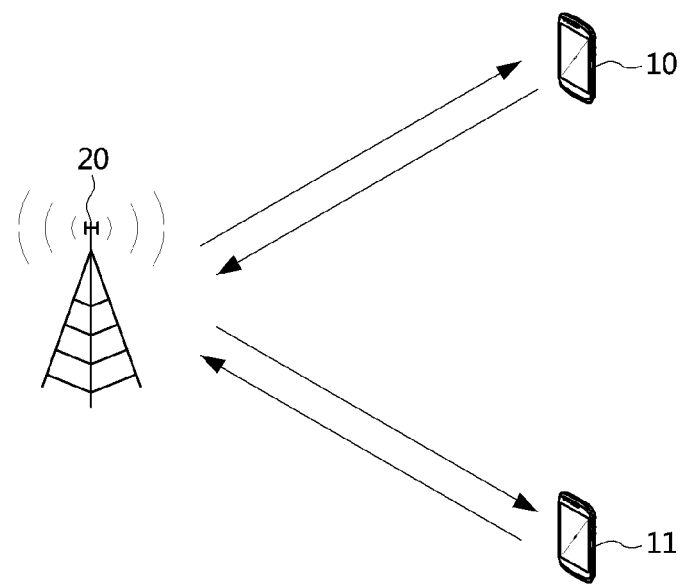
FIG. 1 illustrates a mobile communication system to which a method for scheduling control information and a method for receiving the scheduled control information according to the present invention are applied.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

The present invention provides a multi transmission time interval (Multi-TTI) scheduling method in which a base station performs scheduling so that a terminal can transmit data by using resource areas having a same time-frequency position during multiple TTIs. Also, in the LTE or LTE-Advanced system, since a TTI corresponds to a time length of a single subframe, the scheduling according to the present invention may also be referred to as a 'Multi-subframe scheduling'. Thus, the term 'TTI' may be substituted with the term 'subframe' in the following descriptions.

FIG. 1 illustrates a mobile communication system to which a method for scheduling control information and a method for receiving the scheduled control information according to the present invention are applied.

Referring to FIG. 1, a mobile communication system is deployed in order to provide various communication services such as a voice service, a packet data service, etc.

A mobile communication system includes terminals and a base station performing an uplink communication and a downlink communication with the terminals. The term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions.

Also, the term "base station" used in this specification means a fixed point that communicates with terminals, and may be referred to as another word, such as Node-B, eNode-B, a base transceiver system (BTS), an access point, etc. Also, the term "base station" means a controlling apparatus which controls at least one cell. In a real wireless communication system, a base station may be connected to and controls a plurality of cells physically, in this case, the base station may be regarded to comprise a plurality of logical base stations. That is, parameters configured to each cell are assigned by the corresponding base station.

In this specification, a terminal and a base station have broad meanings as a transmitting and receiving entity implementing technologies or technical spirits which will be explained in the following descriptions. They are not restricted by a specific term or a specific word which is used for representing them.

In FIG. 1, two terminals 10 and 11 and a single base station 20 are illustrated as an example. However, the present invention is not restricted to the above examples. That is, one or more base stations may communicate with a plurality of terminals. Also, a single terminal may communicate with a plurality of terminals.

There is no restriction in a multiple access scheme which can be applied to a communication system according to the present invention. For example, the present invention may use various multiple access schemes such as a Code Division Multiple Access (CDMA), a Time Division Multiple Access (TDMA), a Frequency Division Multiple Access (FDMA), an Orthogonal Frequency Division Multiple Access (OFDMA), an OFDM-FDMA, an OFDM-TDMA, and an OFDM-CDMA.

Also, the present invention may use a Time Division Duplexing (TDD), a Frequency Division Duplexing (FDD), and a hybrid duplexing combining the TDD and the FDD as a multiplexing scheme.

The present invention cannot be interpreted as restricted in a specific wireless communication domain, and should be interpreted as it can be applied to all available wireless communication technology domains.

In FIG. 1, the terminals 10 and 11 and the base station 20 may perform uplink communications and downlink communications. The base station 20 performs downlink transmissions to the terminals 10 and 11. The base station 20 may transmit a Physical Downlink Shared Channel (PDSCH) which is a main physical channel for unicast transmissions. Also, the base station 20 may transmit a Physical Downlink Control Channel (PDCCH) or an enhanced PDCCH (EPD-CCH) including downlink control information needed for the terminal to receive the PDSCH and grant information needed for the terminal to transmit an uplink data channel such as Physical Uplink Shared Channel (PUSCH). In this specification, to transmit and receive a signal through each channel can be represented as the corresponding channel is transmitted or received.

Figure 2:
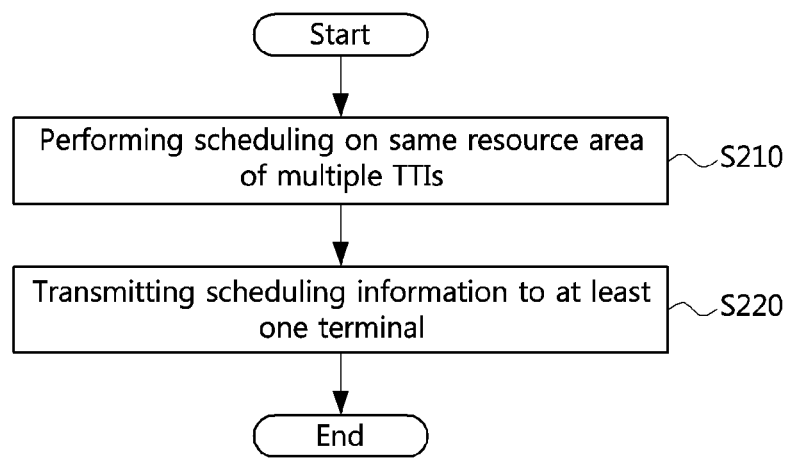
FIG. 2 is a flow chart illustrating a scheduling method performed in a base station according to an example embodiment of the present invention.

FIG. 2 is a flow chart illustrating a scheduling method performed in a base station according to an example embodiment of the present invention.

Referring to FIG. 2, a scheduling method performed in a base station may comprise a step S210 of performing scheduling on a plurality of transmission time intervals (TTIs) which are temporally continuous, and a step S220 of transmitting scheduling information to a first terminal.

Hereinafter, for convenience of explanation, it is referred to as a 'Multi-TTI scheduling' to perform scheduling on a plurality of TTIs which are temporally continuous. Also, the plurality of TTIs includes N (a natural number larger than 1) TTIs comprising a first TTI to a $N^{th}$ TTI.

In the step S210, the base station generates downlink control information (hereinafter, referred to as a 'first DCI') of a PDCCH (or, an EPDCCH) to be transmitted including information related to the number of scheduling target TTIs which are targets of the scheduling (the number of TTIs for which the present scheduling information is valid, that is, it may be N (including the first TTI) or N−1 (excluding the first TTI)), and position information of control channel elements (CCE) to which DCIs for a second TTI to the $N^{th}$ TTI are mapped.

The information about the number of the scheduling target TTIs may be included in the first DCI as represented using a plurality of bits having a length corresponding to the number of the scheduling target TTIs. Also, the position information of the CCEs also may be included in the first DCI as represented using a plurality of bits. Here, the positions of the CCEs included in the second TTI to the Nth TTI may be used as common search spaces.

The CCEs of PDCCH regions in the second TTI to the Nth TTI may include information elements changed dynamically from information included in the first TTI, and the base station may map a DCI including dynamically changed information to the corresponding CCE position of each TTI. Here, dynamically changed information may include a Hybrid Automatic Repeat Request (HARQ) process index, a New Data Indicator (NDI), a Redundancy Version (RV), etc. Such the information may be configured with fewer bits as compared to bits used for the conventional DCI control information.

The terminal may obtain multi-TTI scheduling information based on the first DCI included in the first TTI, and perform data transmission/reception based on the obtained scheduling information.

For example, the base station is assumed to perform scheduling on 6 TTIs for a terminal.

In this case, the terminal decodes a PDCCH included in a first TTI at which the multi-TTI scheduling starts, and identifies that the same resource areas of 5 TTIs comprising the second TTI to $6^{th}$ TTI are scheduled for it. Here, the terminal is to perform PDCCH decoding (not blind decoding) for only CCE positions of the following 5 TTIs which are indicated by the first DCI included in first TTI in order to identify dynamically changed information elements.

Meanwhile, in the step S210, even though the base station has performed the multi-TTI scheduling for a specific terminal, it may still allocate the scheduled resource area to other terminal. At this time, the base station may transmit DCI for other terminal in the scheduled resource area without transmitting DCI to the specific terminal in the scheduled resource area. In this case, the specific terminal (that is, the target of the multi-TTI scheduling) may identify that there is no DCI for it by performing PDCCH decoding on the scheduled resource area. On the other hand, other terminal (not a target of the multi-TTI scheduling) may identify and use the DCI transmitted to it by performing blind-decoding on PDCCH in the resource area scheduled for the specific terminal.

Figure 3:
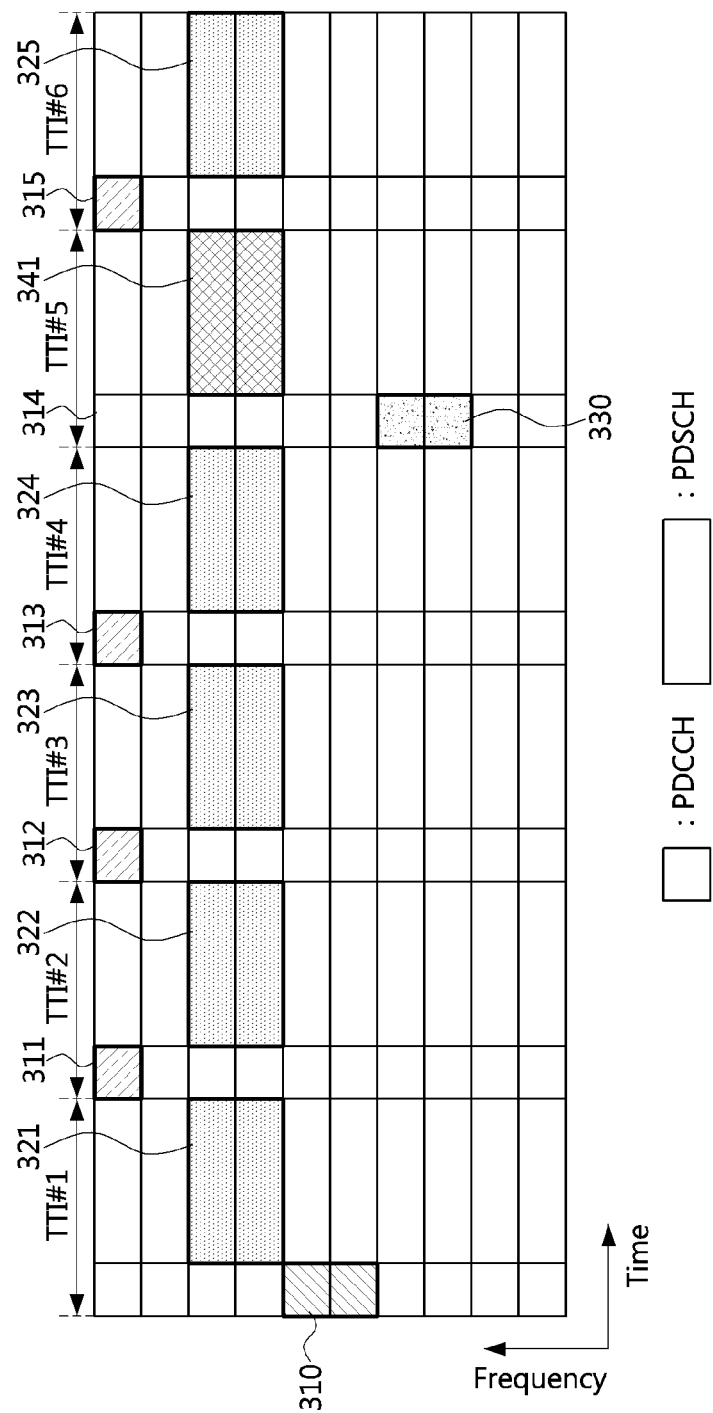
FIG. 3 is a conceptual diagram to explain a scheduling method according to an example embodiment of the present invention.

FIG. 3 is a conceptual diagram to explain a scheduling method according to an example embodiment of the present invention.

FIG. 3 illustrates an example of time-frequency resources when a multi-TTI scheduling is performed for downlink resources. In this example, the multi-TTI scheduling is performed on six continuous TTIs comprising a first TTI (TTI#1) to a sixth TTI (TTI#6).

Referring to FIG. 3, each TTI comprises a resource region to which at least one PDCCH is mapped and a resource region to which at least one PDSCH is mapped. Hereinafter, the former resource region is referred to as a 'control region' or a 'PDCCH region', and the latter resource region is referred to as a 'data region' or a 'PDSCH region'.

According to the LTE or the LTE-advanced standards, a PDCCH region of each TTI may be configured with 4 OFDM symbols at maximum, and the rest of OFDM symbols may be used for a PDSCH region. However, for convenience of explanation, the OFDM symbols are illustrated in FIG. 3 as not discriminated.

As shown in FIG. 3, the base station schedules a DCI for the first terminal in a specific resource area 310 of a PDCCH region of the first TTI (TTI#1), and schedules downlink data for the first terminal in specific resource areas 321 to 325 of PDSCH regions of the second TTI to the sixth TTI. That is, the base station may schedule the downlink data for the first terminal on resource areas 322 to 325 having the same time-frequency position as the resource area 321. In other words, the base station may use the same resource areas for the downlink data for the first terminal during the six TTIs which are temporally continuous.

In this case, the base station locates the DCI for the PDCCH blind decoding of the first terminal in the PDCCH region 310 of the first TTI. Here, the above DCI may include the number of scheduled TTIs following the first TTI and position information of CCEs, that is, 311 to 315, on which PDCCH decoding is to be performed in the following TTIs (that is, the second TTI to the sixth TTI). Also, the base station schedules DCIs for the first terminal on the corresponding positions of the second TTI to the sixth TTI. As described above, the DCIs scheduled on the second TTI to the sixth TTI may include information changing dynamically, such as a HARQ process index, a NDI, a RV, etc.

On the other hand, the first terminal identifies the DCI (hereinafter, referred to as a 'first DCI') scheduled for it by performing blind decoding on the PDCCH region 310. The first terminal can receive data transmitted to it in the PDSCH region 321 designated by the identified first DCI. Also, the first terminal identifies the number of scheduled TTIs based on the identified first DCI, and identifies positions of CCEs to be decoded in the following TTIs (from the second TTI to the sixth TTI).

The first terminal identifies a second DCI scheduled for it by performing PDCCH decoding on the obtained CCE position 311 of the second TTI. Then, the first terminal receives downlink data transmitted to it which is located in the region 322 of the PDSCH region of the second TTI indicated by the second DCI. Here, the second DCI may include only information changed from the first DCI. Accordingly, the size of resource allocated to the second DCI may be smaller than that of the first DCI.

The first terminal also can receive downlink data for it in the third TTI and the fourth TTI by performing operations similar to the above-described operation.

Meanwhile, when the first terminal performs a PDCCH decoding on the corresponding CCE position 314 in the fifth TTI, it may identify that there is no DCI 314 scheduled for it in the fifth TTI. In this case, the first terminal can identify that the corresponding PDSCH resource is allocated to other terminal (hereinafter, referred to as a 'second terminal') by the base station. That is, this case can be referred to an overriding case.

The second terminal may identify a DCI scheduled for it by performing blind PDCCH decoding on the PDCCH region 330 the fifth TTI, and receive data transmitted to it through the PDSCH region 341 of the fifth TTI designated by the identified DCI. Here, the PDSCH region 341 may be overlapped with the PDSCH region scheduled for the first terminal.

In the sixth TTI, the first terminal receives downlink data by performing an operation similar to the above-described operation performed in the second TTI.

Although an example in which a scheduling on six continuous TTIs is performed is illustrated in FIG. 3, the number of multiple TTIs which can be targets of the multi-TTI scheduling according to the present invention is not restricted to 6. That is, there is no restriction in the number of TTIs which can be targets of the multi-TTI scheduling according to the present invention. For example, a base station may determine the number of TTIs dynamically on the basis of amount of data to be transmitted to a terminal, a type of the service to be provided, Quality of Service (QoS) class of the service to be provided, etc.

Figure 4:
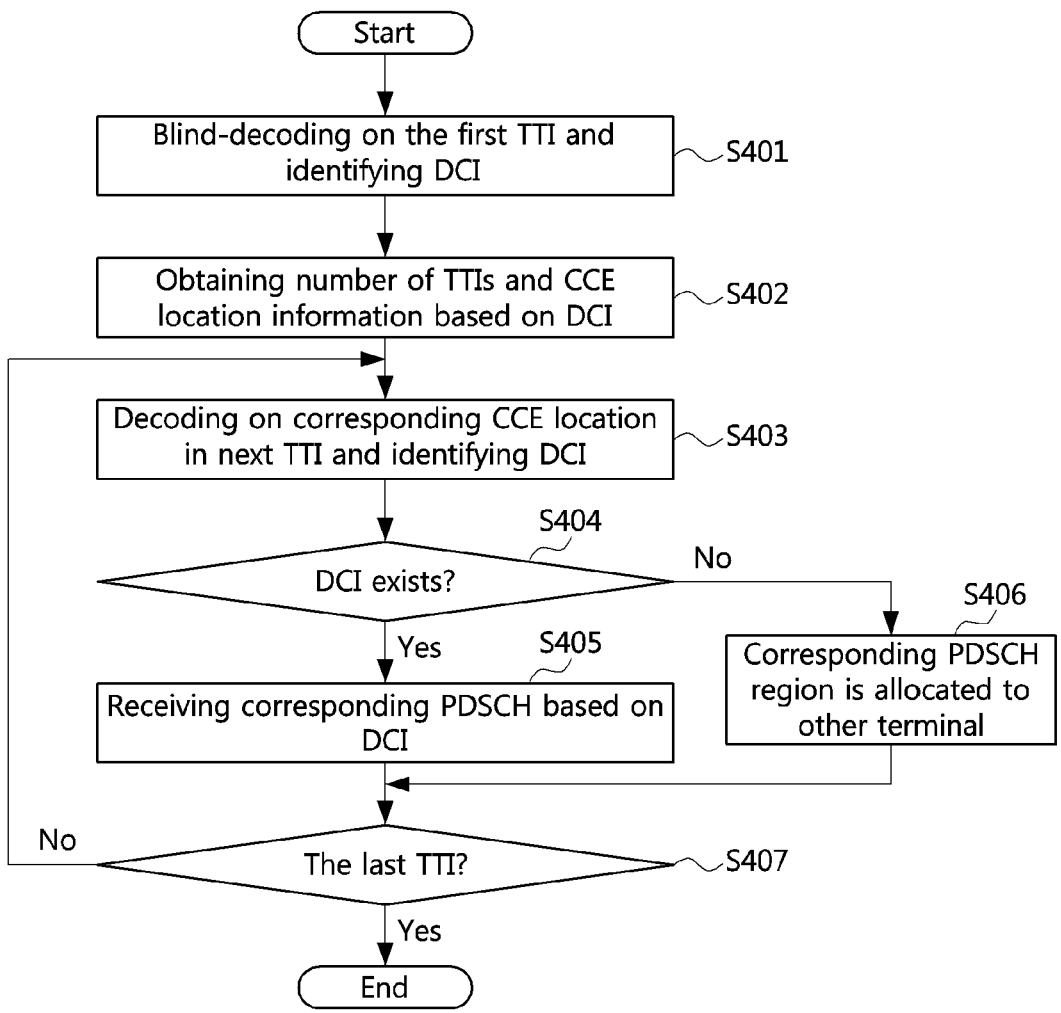
FIG. 4 is a flow chart illustrating an operation method of a terminal according to an example embodiment of the present invention.

FIG. 4 is a flow chart illustrating an operation method of a terminal according to an example embodiment of the present invention.

In FIG. 4, as explained in FIG. 2 and FIG. 3, when a base station is assumed to transmit signals by performing Multi-TTI scheduling, an example in which a terminal processes received signals is illustrated.

Referring to FIG. 4, if a terminal receives signal scheduled on multiple TTIs, the terminal identifies a DCI scheduled for it by performing blind decoding on a PDCCH of a first TTI among the multiple TTIs (S401).

Then, based on the identified DCI (hereinafter, referred to as a 'first DCI'), the terminal checks the number of scheduled TTIs and positions of CCE to which DCIs for the following TTIs are mapped. (S402). Also, the terminal receives data through a PDSCH region scheduled for it in the first TTI based on the first DCI.

The terminal performs PDCCH decoding on a corresponding CCE position in a PDCCH region of the following TTI based on the position information of CCE obtained in the first TTI, and tries to obtain a DCI (hereinafter, referred to as a 'second DCI') from the PDCCH decoding (S403). Also, the terminal checks whether the second DCI exists in the current TTI based on the identified first DCI (S404).

If the second DCI exists in the second TTI, the terminal may receive downlink data scheduled in a data region of the second TTI (S405). On the contrary, if the second DCI does not exist in the second TTI, the terminal identifies that there is not downlink data transmitted to it in the second TTI (S406). In this case, the PDSCH region in the second TTI allocated to the terminal may be allocated to other terminal.

Here, the second DCI may include information which is changed from the information included in the first DCI. For example, the information which is changed from the information included in the first DCI may include a HARQ process index, a NDI, a RV, etc. When the information included in the second DCI is configured as difference information (that is, a delta value) from the information included in the first DCI, the terminal may obtain changed control information by applying the information of the second DCI to the information of the first DCI.

Then, the terminal identifies whether the current TTI is the last TTI among scheduled multiple TTIs based on the information obtained in the step S402. If the current TTI is not the last TTI, the step S403 and the steps following the step S403 are repeated.

While the example embodiments of the present invention and their advantages have been described in detail, it should be understood that various changes, substitutions and alterations may be made herein without departing from the scope of the invention.

What is claimed is:

1. A scheduling method performed in a base station, the method comprising:
performing scheduling on a plurality of transmission time intervals (TTIs) including a first TTI to a $N^{th}$ TTI which are temporally continuous, wherein N is a natural number larger than 1; and
transmitting scheduling information obtained from the scheduling to a first terminal, wherein in the performing scheduling,
control information including position information of resource areas in a second TTI to the $N^{th}$ TTI to be decoded by the first terminal is mapped to a specific area of the first TTI, and
the resource areas in the second TTI to the $N^{th}$ TTI to be decoded by the first terminal include information which is changed dynamically from the control information mapped in the first TTI.

2. The method of claim 1, wherein, in the performing scheduling, downlink data for the first terminal is scheduled or uplink transmission opportunity is scheduled on resource areas having same time-frequency position for the plurality of TTIs.

3. The method of claim 1, wherein, in the performing scheduling, control information including information related to a number of the plurality of TTIs is mapped to a specific resource area of the first TTI.

4. The method of claim 1, wherein the information which is changed dynamically includes an index of a Hybrid Automatic Repeat Request (HARQ) process, a new data indicator (NDI), and redundancy version (RV) information.

5. The method of claim 1, wherein, when positions of the resource areas in the second TTI to the $N^{th}$ TTI to be decoded by the first terminal are fixed, control information to be decoded by the first terminal is scheduled on the resource areas as common search spaces.

6. The method of claim 1, wherein resources in the second TTI to the $N^{th}$ TTI, which are scheduled for the first terminal by the first TTI, can be scheduled for a second terminal.

7. A method for receiving control information scheduled on a plurality of transmission time intervals (TTIs) including a first TTI to a $N^{th}$ TTI which are temporally continuous, performed in a terminal, wherein N is a natural number larger than 1, the method comprising:
identifying first control information by performing blind decoding on a control region in the first TTI; and
identifying second control information by performing decoding on resource areas having same time-frequency position in a second TTI to the $N^{th}$ TTI, which are indicated by the first control information, wherein
the first control information include at least one of information related to a number of the plurality of TTIs and position information of resource areas in a second TTI to the $N^{th}$ TTI to be decoded by the first terminal, and
the second control information include information which is changed dynamically from the first control information.

8. The method of claim 7, further comprising:
after identifying the second control information, reflecting the information which is changed dynamically from the first control information.

9. The method of claim 7, wherein the second control information include an index of a Hybrid Automatic Repeat Request (HARQ) process, a new data indicator (NDI), and redundancy version (RV) information.

10. The method of claim 7, wherein, in the identifying second control information, when the second control information is not detected in a specific resource area indicated by the first control information, the terminal identifies that a TTI to which the specific resource area belongs is scheduled to another terminal.

11. The method of claim 7, further comprising:
receiving downlink data in each TTI based on the first control information and the second control information or transmitting uplink data using scheduled resources in each TTI based on the first control information and the second control information.

* * * * *